(Specimens)
F. M. LYTLE.
MOLD FOR CASTING.
No. 422,055.      Patented Feb. 25, 1890.
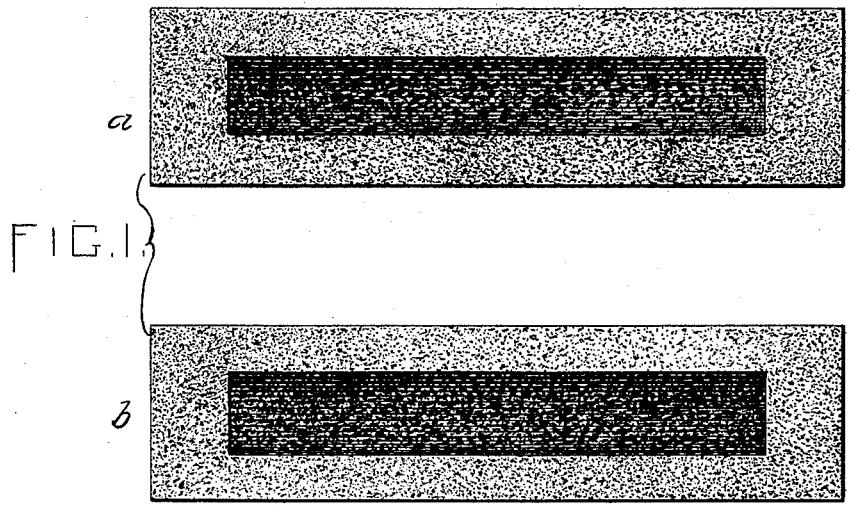
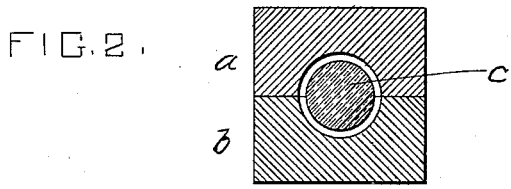
WITNESSES.
A. D. Harrison
W. C. Ramsay.
INVENTOR.
F. M. Lytle.
By Wright, Brown & Crossley,
attys.

UNITED STATES PATENT OFFICE.

FELTON M. LYTLE, OF BOSTON, MASSACHUSETTS, ASSIGNOR TO ADDISON R. BALDWIN, TRUSTEE, OF CHARLOTTE, NEW YORK.

MOLD FOR CASTING.

SPECIFICATION forming part of Letters Patent No. 422,055, dated February 25, 1890.

Application filed June 23, 1888. Serial No. 277,979. (Specimens.)

*To all whom it may concern:*

Be it known that I, FELTON M. LYTLE, of Boston, in the county of Suffolk and State of Massachusetts, have invented certain new and useful Improvements in Molds for Casting Metal, of which the following is a specification.

My invention relates to molds in which metal is cast to desired shape, and has for its object the production of a comparatively permanent mold which will be durable, which will not chill the metal during the operation of pouring, and which can be made perfectly smooth, so that smooth perfect castings can be secured.

To these ends my invention consists of a mold for casting metal of carbon produced from carbonized and powdered *Algæ*, or sea-weed, and pitch molded or compressed, and a core also composed of similar carbon, but of greater porosity and a more yielding character than the body of the mold, all as hereinafter more fully described and claimed.

Reference may be had to the accompanying drawings, and the letters of reference marked thereon, forming a part of this specification, in which drawings—

Figure 1 portrays two halves or parts of a mold embodying my invention, which mold is adapted to the casting of a round or cylindrical body. Fig. 2 is a cross-section of the mold, showing also the core in position therein.

In carrying out my invention I take carbon, made from *Algæ*, or sea-weed, because of its fine grain, and after reducing it to the form of fine powder it is placed with pitch, in the form of solid lumps, in an iron kettle, the proportion of the two ingredients being two-thirds of carbon and one-third of pitch, by weight. The kettle is then heated sufficiently hot to melt the lumps of pitch, and the mass is thoroughly stirred in order to intermix the two ingredients, which end accomplished the mixture is taken from the kettle, and (as it will be) in a hard lumpy state is placed in a steel barrel with a number of steel balls and the barrel is revolved rapidly. The effect of the balls flying around with the mixture in the barrel is to reduce the mixture to a very fine powder, in which condition it is poured or placed in the matrix of a steel mold, the exact counterpart of the carbon mold it is desired to produce. The steel mold is then heated sufficiently to melt the powdered pitch in the mixture, and immediately hydraulic pressure is applied to the extent of three to four thousand pounds per square inch. The carbon mold is then removed from the matrix of the steel mold.

In order to partially expel and carbonize the pitch which remains in the carbon mold in a raw state, said mold is placed in a muffled retort or furnace and heated to a red heat. It is then allowed to cool in the furnace, and is a finished article.

The carbon above referred to as being made from *Algæ* is produced by first washing and then drying a suitable quantity of *Algæ*, or sea-weed, which is carbonized by being placed in closed retorts and subjected to a high degree of heat. The product thus obtained is then treated with dilute acid and finally dried.

Though the process of making the mold forms no part of my present invention, that hereinbefore described will be found suitable for manufacturing my invention.

In the drawings, $a$ represents one half and $b$ the other half of a mold embodying my invention, though in some instances the mold can be constructed of a single piece or part, as will be obvious to those skilled in the art.

$c$ designates the core.

A mold constructed in accordance with my invention will be comparatively permanent and durable and the surface of its matrix can be made perfectly smooth, so that smooth perfect castings can be produced, and in these respects it has advantages over iron, sand, loam, or any other mold now known to me.

Another great advantage derived from my mold is that it can be heated so as not to chill the metal during the act of pouring the same therein—a thing that cannot be done with other molds now in use.

In the construction of the cores $c$, I prefer to form them (the cores) of carbon of great porosity, and hence softer or more yielding in character than the body of the mold, so that the cores will yield to the pressure of the metal forming the castings, thereby preventing ruptures or cracks in the castings caused by the contraction of the metal in cooling, and also permitting the cores to be easily removed from the castings.

One of the ways or processes by which the cores may be formed may be set forth as follows: Powdered carbon of the same character as may be used to form the body of the mold is taken and mixed with an adhesive liquid substance—such as molasses, a liquid solution of dextrine, or a similar substance—so as to form a thick paste, which is lightly tamped into a paper mold having the exact form of the core it is desired to produce. This paper mold and its contents are then placed in a crucible or suitable box covered with sand to avoid free access of air and brought to a red heat, the effect being to carbonize the paper mold, and the raw material in the carbon forming the core in the paper mold. After carbonization the paper mold will fall away, leaving the core completed. Cores so formed are highly porous and yielding in nature and possess great advantages over cores now commonly used in connection with molds of common construction, in that in the castings of hollow articles, particularly large cannons and the like, a smoother surface can be given to the casting than with cores commonly employed, and, besides this, chill and rupture of the casting are avoided.

My improved molds and cores also possess great advantages over molds and cores now commonly used for casting ingots, as by their use smooth homogeneous unchilled castings can be obtained.

What I claim is—

1. A mold for casting metal, composed of compressed or solidified carbon, consisting of carbonized and powdered *Algæ*, or sea-weed and pitch, as set forth.

2. A core for molds for casting metals, composed of compressed and partially solidified carbon, consisting of carbonized and powdered *Algæ*, or sea-weed, pitch, and an adhesive liquid substance, as set forth.

3. A core for molds for casting metal, composed of compressed and partially solidified carbon, consisting of carbonized and powdered *Algæ*, or sea-weed, pitch, and molasses or other adhesive liquid substance, as set forth, said carbon being yielding in character.

In testimony whereof I have signed my name to this specification, in the presence of two subscribing witnesses, this 18th day of June, A. D. 1888.

FELTON M. LYTLE.

Witnesses:
ARTHUR W. CROSSLEY,
A. D. HARRISON.